(12) United States Patent
Holzinger et al.

(10) Patent No.: US 6,584,432 B1
(45) Date of Patent: Jun. 24, 2003

(54) REMOTE DIAGNOSIS OF DATA PROCESSING UNITS

(75) Inventors: Bernhard Holzinger, Boeblingen (DE); Joerg Weedermann, Boeblingen (DE); Ralf Link, Gaeufelden (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/327,255

(22) Filed: Jun. 7, 1999

(51) Int. Cl.$^7$ .............................................. G06F 11/00
(52) U.S. Cl. ........................ 702/188; 702/108; 702/117; 702/120; 702/121; 702/183; 702/186
(58) Field of Search .............................. 702/57, 58, 59, 702/60, 62, 108, 117, 118, 120, 121, 122, 182–186, 188, FOR 103, FOR 104, FOR 106, FOR 134, FOR 135, FOR 170, FOR 171; 714/25, 37, 44, 47

(56) References Cited

U.S. PATENT DOCUMENTS

| | | | | |
|---|---|---|---|---|
| 3,879,712 A | * | 4/1975 | Edge et al. ............... | 340/172.5 |
| 3,921,141 A | * | 11/1975 | Wilber et al. ............. | 340/172.5 |
| 3,988,579 A | * | 10/1976 | Bottard et al. ......... | 235/153 AK |
| 4,039,813 A | * | 8/1977 | Kregness ................... | 235/253 |
| 4,057,847 A | | 11/1977 | Lowell et al. | |
| 4,192,451 A | * | 3/1980 | Swerling et al. ............... | 371/20 |
| 4,315,311 A | * | 2/1982 | Causse et al. ............... | 364/200 |
| 4,503,535 A | * | 3/1985 | Budde et al. ................. | 371/11 |
| 4,562,536 A | * | 12/1985 | Keeley et al. ............... | 364/200 |
| 4,701,845 A | * | 10/1987 | Andreasen et al. ........... | 714/31 |
| 4,823,343 A | * | 4/1989 | Takahashi ..................... | 714/46 |
| 4,924,391 A | * | 5/1990 | Hirano et al. .......... | 364/424.03 |
| 4,953,165 A | * | 8/1990 | Jackson ........................ | 714/44 |
| 5,005,142 A | * | 4/1991 | Lipchak et al. ............. | 376/245 |
| 5,255,208 A | * | 10/1993 | Thakore et al. ........ | 364/551.01 |
| 5,357,519 A | * | 10/1994 | Martin et al. ............... | 371/15.1 |
| 5,455,933 A | * | 10/1995 | Schieve et al. .............. | 710/723 |
| 5,594,663 A | * | 1/1997 | Messaros et al. ............... | 700/9 |
| 5,659,680 A | * | 8/1997 | Cunningham et al. . | 395/183.01 |
| 6,041,287 A | * | 3/2000 | Dister et al. ................. | 702/182 |
| 6,070,253 A | * | 5/2000 | Tavallaei et al. .............. | 714/31 |
| 6,175,934 B1 | * | 1/2001 | Hershey et al. ............. | 700/177 |
| 6,189,114 B1 | * | 2/2001 | Orr .............................. | 714/25 |
| 6,192,490 B1 | * | 2/2001 | Gross ........................... | 714/47 |
| 6,212,651 B1 | * | 4/2001 | Schieve et al. ............... | 714/36 |
| 6,233,702 B1 | * | 5/2001 | Horst et al. ................... | 714/48 |
| 6,321,174 B1 | * | 11/2001 | Chen et al. ................. | 702/122 |
| 6,324,485 B1 | * | 11/2001 | Ellis ........................... | 702/117 |

FOREIGN PATENT DOCUMENTS

| | | |
|---|---|---|
| EP | 671631 A2 | 3/1995 |
| EP | 0962862 A1 * | 8/1999 |
| GB | 2261967 A | 6/1992 |
| JP | 200020342 * | 1/2000 |

OTHER PUBLICATIONS

European Search Report, Dec. 16, 1998, EP 98 11 0357.

* cited by examiner

*Primary Examiner*—Marc S. Hoff
*Assistant Examiner*—Carol S Tsai

(57) ABSTRACT

Disclosed is a diagnostic unit for a remote diagnosis of a data processing unit (DPU). The diagnostic unit is adapted to be coupled to a remote DPU via a network and to an internal bus of the DPU. The diagnostic unit includes a central processing unit (CPU) for controlling a diagnostic action and/or a monitoring action independently of the DPU, by monitoring a data communication within the DPU and/or of the DPU with external devices, and/or by performing tests with the DPU. An "intelligent" diagnosis of the DPU can thus be provided, allowing a continuous and on-going monitoring of the DPU independent of the functional state of the DPU.

14 Claims, 2 Drawing Sheets

REMOTE DIAGNOSIS OF DATA PROCESSING UNITS

BACKGROUND OF THE INVENTION

The present invention relates to a diagnosis of a data processing unit (DPU).

Today, the overall number of personal computers (PCs), workstations, and so on is increasing year by year. Those kind of data processing units are physically spread all over the place and might be interconnected with standard network interfaces such as local area networks (LAN).

The diagnosis of a remote DPU, i.e. a DPU which is not physically located on the acting person's "desk", is normally accomplished by either bringing a skilled person (i.e. a hardware or software expert) to the DPU, or by providing software packages installed on the DPU to perform a diagnostic task as long as the DPU is functional.

SUMMARY OF THE INVENTION

It is an object of the present invention to provide an improved remote diagnosis for a data processing unit.

The object is solved by the independent claims. Preferred embodiments are shown by the dependent claims.

According to the invention, a diagnostic unit is provided for a remote diagnosis of a data processing unit DPU. The diagnostic unit is adapted to be coupled to a remote DPU via a network and to an internal bus of the DPU. The diagnostic unit comprises a central processing unit CPU for controlling a diagnosis and/or a monitoring, independently of the DPU, by monitoring a data communication within the DPU and/or of the DPU with external devices, and/or by performing tests with the DPU.

The invention thus provides an "intelligent" diagnosis of the DPU that allows a continuous and on-going monitoring of the local DPU independent of its' functional state. In contrast to diagnostic modules as know in the art, a diagnosis of the local DPU 100 can thus be performed even when the local DPU 100 is inoperable or when the local DPU 100 would not any more support an "unintelligent" monitoring.

The invention further allows an active diagnosis and/or a preventive diagnosis of the DPU, so that occurring failures or failures which are apparently likely to occur in the next future can be determined and suitable (counter) measures can be initiated or triggered. Possible down times of the DPU can thus be decreased or even be avoided.

The diagnostic unit preferably signals from time to time and/or according to a pre-defined notification scheme the present state of the DPU to a remote DPU. When a failure occurs or is likely to occur, the remote DPU can provide a diagnosis of the DPU via the network and preferably using the diagnostic unit.

BRIEF DESCRIPTION OF THE DRAWINGS

Other objects and many of the attendant advantages of the present invention will be readily appreciated and become better understood by reference to the following detailed description when considering in connection with the accompanied drawings in which.

DETAILED DESCRIPTION OF THE INVENTION

Figure 1:
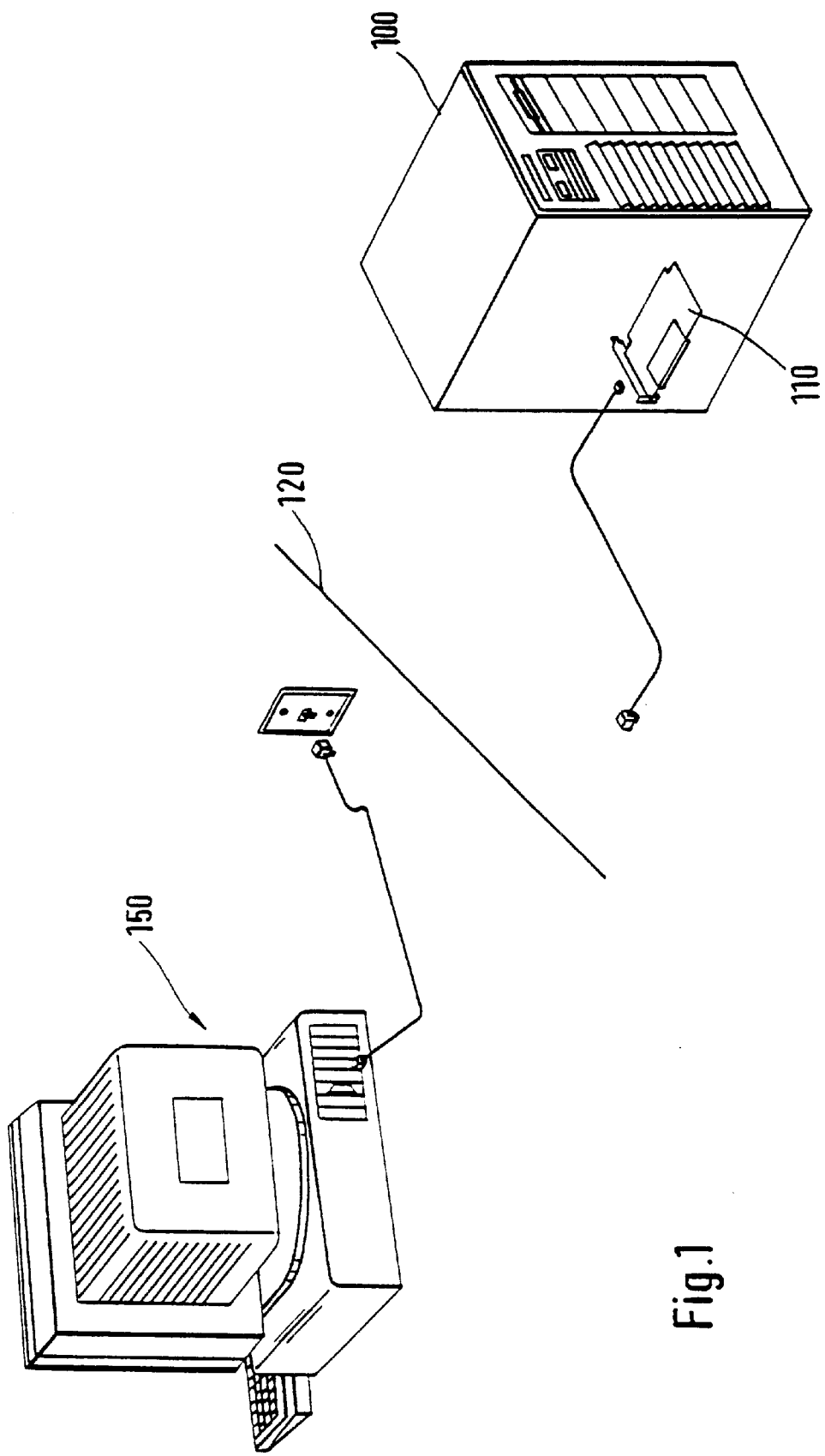
FIG. 1 shows a schematic diagram of the remote diagnosis scheme according to the invention.

FIG. 1 shows a schematic diagram of the remote diagnosis scheme according to the invention. A data processing unit (DPU) 100 comprises a diagnostic unit 110 that can be coupled by any means as known in the art to a network 120.

DPU 100 is to be monitored by diagnostic unit 110. A remote DPU 150 can also be coupled to the network 120. The remote DPU 150 is a system that can interact with the diagnostic unit 110, thus allowing a user (e.g., sitting in front of the remote DPU 150) to control a task performed by diagnostic unit 110. DPU 150 could therefore be called a client station.

Figure 2:
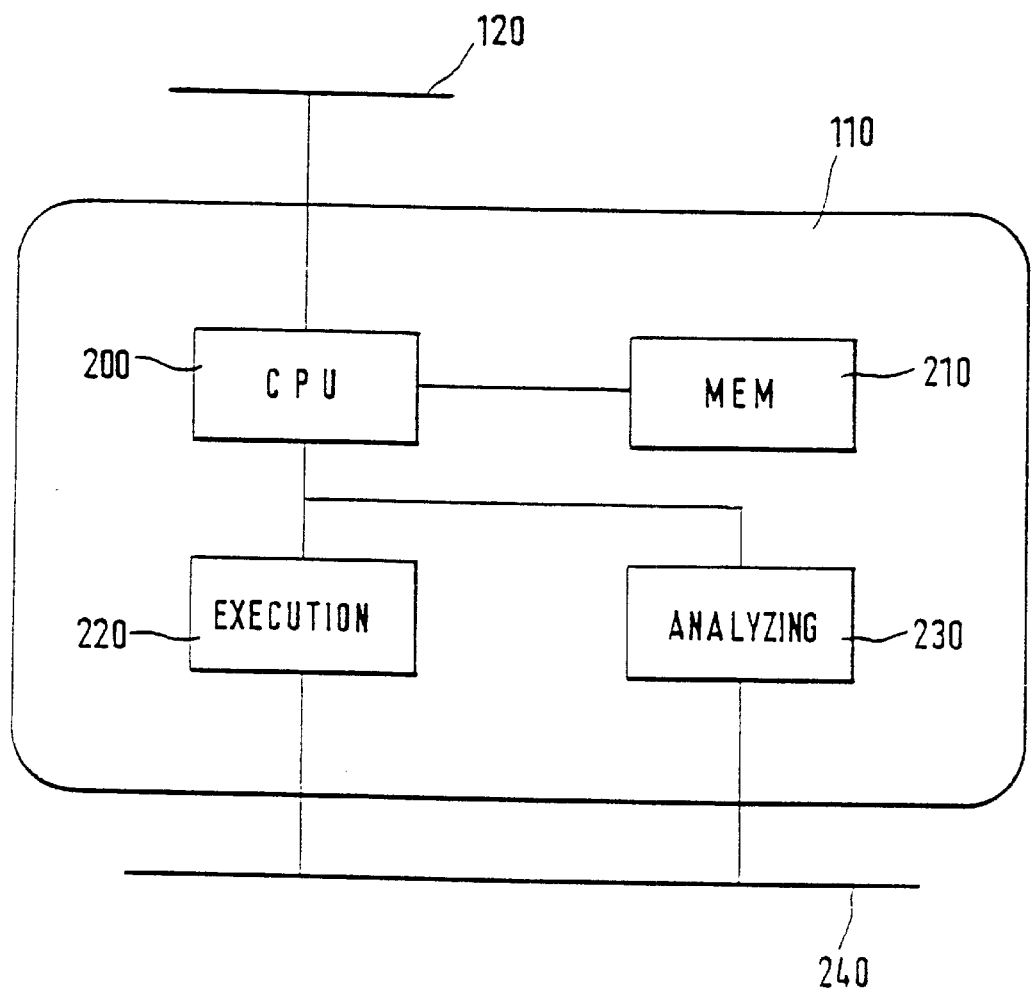
FIG. 2 shows a preferred example of the diagnostic unit 110.

FIG. 2 shows in a schematic diagram a preferred example of the diagnostic unit 110. The diagnostic unit 110 provides an own central processing unit (CPU) 200 and is thus capable of performing all kind of diagnoses and/or monitoring independently of the DPU 100. The CPU 200 is connected to a memory 210 and to an execution unit 220 and/or an analyzing unit 230. In operation, the execution unit 220 and the analyzing unit 230 are coupled to an internal bus 240 of the DPU 100, whereby the internal bus 240 may represent one or more different internal busses or other internal communication paths of the DPU 100. The CPU 200 can be coupled to the network 120 (i.e. the 'outside world') e.g. via LAN or a serial port such as modem, nullmodem or the like, and might also be coupled (not shown) to the internal bus 240.

In a preferred embodiment, the diagnostic unit 110 comprises an own (not shown) power supply unit independent of a power supply of the DPU 100. The independent power supply unit might be connected to the main electrical supply and/or battery powered.

The analyzing unit 230 is provided for passively monitoring data communications within the DPU 100 and/or for passively monitoring data communications of the DPU 100 with external devices. For that purpose, the analyzing unit 230 measures and analyzes data, data streams, and/or events on the internal bus 240. The execution unit 220 is provided for actively performing tests on the DPU 100. For that purpose, the execution unit 220 provides stimulus signals to the DPU 100 and/or requests specific tasks, data, operations, or the like from (individual components of) the DPU 100. The analyzing unit 230 and the execution unit 220 are controlled by the CPU 200 in a way as known in the art.

The diagnostic unit 110 might be used in an active diagnostic mode and/or a preventive diagnostic mode, as explained below.

In the active diagnostic mode, the execution unit 220 of the diagnostic unit 110 provides stimuli signals to the DPU 100 and analyzes the behavior thereof. One example for an active mode is a memory testing. The diagnostic unit 110 reads in a deterministic way all locations of a memory of the DPU 100 (e.g. a RAM), thus determining whether there is a problem with that memory.

In the preventive diagnostic mode, the diagnostic unit 110 performs an ongoing analysis of the DPU 100 by actively and/or passively monitoring the DPU 100. In case of an upcoming problem, the diagnostic unit 110 will preferably emit a warning signal to the DPU 100 and/or one or more other DPUs via the network 120 such as the remote DPU 150 or to another notification path (e.g. an alphanumeric pager). The notification of that warning signals will allow the owner of the DPU 100 to initiate appropriate counter measures (e.g. repair of the DPU 100) before the DPU 100 might break. This allows preventing a possible business loss to the owner of the DPU 100 and significantly increases the availability of the DPU 100.

As well in the active diagnostic mode as in the preventive diagnostic mode, the diagnosis provided by the diagnostic unit 110 can be triggered from the diagnostic unit 110 itself or from 'outside', e.g., from the remote DPU 150. In the former case, the diagnostic unit 110 performs a diagnosis of the local DPU 100 according to a given scheme, such as a pre-given notification, time, or event scheme, or on demand. In the latter case, the diagnostic unit 110 receives a trigger signal initiating a diagnostic activity carried out by the diagnostic unit 110 itself.

When the diagnostic unit 110 detects a failure, which already occurred or which will possible occur in future, the diagnostic unit 110 will initiate appropriate measures such as emitting a warning signal via the network 120 to the remote DPU 150 or to another notification path (e.g. an alphanumeric pager) indicating a fault and/or a full operation of the DPU 100, starting own failure correcting measures, and/or requesting a remote diagnosis, e.g. from the remote DPU 150.

For providing a remote diagnosis, either on request by the diagnostic unit 110 or according to a pre-given notification, time, or event scheme, the remote DPU 150 can connect to the diagnostic unit 110 via the network 120. This can be accomplished either by a person trying to establish connection with the diagnostic unit 110 or automatically by a defined scheme provided by the remote DPU 150. The remote DPU 150 can thus run a diagnose on the DPU 100 with a given tool set provided by the remote DPU 150. The tool set might consist of diagnostic software tasks, also called diagnostic 'daemons', that can be downloaded to the diagnostic unit 110 from the remote DPU 150 or from any other DPU connected to the network 120. The theoretical number of possible diagnostic daemons is thus infinite, whereas the actual number of daemons running on the diagnostic unit 110 is limited by the available resources. This so-called "Cafeteria Approach" allows to select "the right" daemon for a specific task to be done.

Even when the diagnostic unit 110 detects no failure, the diagnostic unit 110 might provide signals from time to time to the network 120 and/or the DPU 100 indicating a (full, limited, or sufficient) functionality of the DPU 100.

In one embodiment, the analyzing unit 230 comprises a protocol checker (not shown) for monitoring traffic on the internal bus 240. The protocol checker is provided for detecting protocol violations on the internal bus 240. Protocol violations can be caused e.g. by an adapter card in the DPU such as a NIC (Network Interface Adapter) or a Video Adapter. Protocol violations could typically lead the DPU 100 to crash without any obvious reason for the owner of the DPU 100.

In another embodiment, the analyzing unit 230 comprises a performance sequence counter (not shown) for measuring a bus utilization of the internal bus 240 thus indicating the "load" of the bus. A single measurement task might be provided generating an alert if a certain threshold is violated. An example of an alert could be that the DPU 100 is running at more than x % utilization for a certain period of time (e.g. more than 98% utilization for more than two hours). This indicates that the DPU 100 suffers under heavy data traffic or that the DPU 100 might be crashed. The utilization could, on the other hand, verify the execution of a specific task running on the DPU 100, e.g. a backup task. In an example, a backup task of the DPU 100 is always scheduled for midnight. The actual execution of the backup task can then be verified by determining the utilization that is expected to be y %, e.g. 90%.

In a further preferred embodiment, the diagnostic unit 110 is provided as a plug-in card, e.g. a PCI-add-on card, which can be plugged into any PCI compliant PC or PC server. The plug-in card preferably features an on-board CPU 200, an onboard diagnostic hardware comprising the analyzing unit 230 and the execution unit 220, and the memory 210 as a flash memory and a DRAM (dynamic random-access memory). The CPU 200 is connectable to the network 120 via LAN and/or a Serial (Modem). A communication to the internal bus 240 is provided by PCI and IPMI interfaces. The diagnostic unit 110 allows performing e.g. a preventive memory diagnosis by deterministic reading through the available memory of the DPU 100. In case that the reading results in an error, this error is documented in a specific storage location of the DPU 100 which can be accessed by the IPMI interfaces.

In yet a further preferred embodiment, the reading mechanism of the diagnostic unit 110, comprising the CPU 200, the execution unit 220, and the analyzing unit 230, is preferably implemented by an ASIC (Application Specific Integrated Circuit) e.g. on a plug-in card of the diagnostic unit 110 featuring a PCI-Interface. The on-board CPU 200 preferably reads the memory locations of the DPU 100 using the execution unit 220 of the ASIC and the internal PCI bus 240 of the DPU 100. This pure hardware mechanism does not depend on the status of the operating system (OS) or the presence of a fully functional CPU of the DPU 100. All of the accessible hardware of the DPU 100 can be diagnosed using the internal PCI bus 240 as a window to the DPU 100. The diagnostic unit 110 might providet further diagnosis of SCSI controllers, USB controllers, hard-disk units and so on of the DPU 100.

What is claimed is:

1. A diagnostic unit for a remote diagnosis of a local data processing unit (DPU) having a first central processing unit (CPU), said diagnostic unit coupled to a remote DPU via a network and to said local DPU via an internal bus, said diagnostic unit comprising:
   a second central processing unit which is independent of said DPU and said first CPU, wherein said second CPU is capable of controlling at least one of a diagnostic action or a monitoring action, independently of said local DPU, by monitoring at least one of a data communication within said local DPU or a data communication by said local DPU with external devices, or by performing tests on said local DPU.

2. The diagnostic unit of claim 1, further comprising an analyzing unit, coupled to said second CPU and said internal bus of said local DPU, for passively monitoring at least one of data communications within said local DPU or communications of said local DPU with external devices.

3. The diagnostic unit of claim 2, wherein the analyzing unit provides means for measuring and analyzing at least one of data, data streams or events on the internal bus.

4. The diagnostic unit of claim 1, further comprising an execution unit coupled to said second CPU and said internal bus of said local DPU, for actively performing tests on said local DPU.

5. The diagnostic unit of claim 4, wherein said execution unit provides means for emitting a stimulus signal to said local DPU or for requesting specific tasks, data, and/or operations from said local DPU.

6. The diagnostic unit of claim 1, further comprising a power supply unit independent of a power supply of said local DPU.

7. The diagnostic unit of claim 1, wherein said diagnostic unit is provided as a plug-in card to be plugged into said local DPU.

8. A method for providing a remote diagnosis of a local data processing unit (DPU) having a first central processing unit (CPU), said method comprising:

coupling a diagnostic unit having a second CPU independent from said local DPU and said first CPU to an internal bus of said local DPU, monitoring at least one of: a data communication within said local DPU or a data communication of said local DPU with external devices, or performing tests on said local DPU, coupling said diagnostic unit to a remote DPU via a network, and providing a signal to said remote DPU indicating a functional state of said local DPU.

9. The diagnostic unit of claim 1, wherein said diagnostic unit comprises said second central processing unit adapted to be coupled to said remote DPU via a network and to said local DPU via an internal bus disposed of within said DPU.

10. The diagnostic unit of claim 9, wherein said second central processing unit is independent from said local DPU and said first CPU.

11. The method of claim 8 wherein said monitoring occurs independent of said functional state of said local DPU.

12. The method of claim 8, wherein said signal is provided independently of said functional state of said local DPU.

13. A diagnostic unit for remote diagnosis of a local data processing unit (DPU) having a local central processing unit (CPU), said diagnostic unit comprising:

a remote central processing unit adapted to be coupled to a remote DPU via a network and to said local DPU via an internal bus;

wherein said diagnostic unit controls at least one of a diagnostic action or monitoring action of said local DPU, independently of said local CPU, by monitoring at least one of a data communication within said local DPU or a data communication by said local DPU with external devices or by performing tests on said local DPU by means of said remote CPU.

14. The diagnostic unit of claim 13, wherein said central processing unit is independent from the local central processing unit.

* * * * *